United States Patent [19]

Gavrilovich

[11] Patent Number: 4,685,129

[45] Date of Patent: Aug. 4, 1987

[54] POWER TRANSMISSION ARRANGEMENT FOR TELECOMMUNICATIONS SYSTEMS

[75] Inventor: Charles D. Gavrilovich, Naperville, Ill.

[73] Assignee: American Telephone and Telegraph Company, AT&T Bell Laboratories, Murray Hill, N.J.

[21] Appl. No.: 783,129

[22] Filed: Oct. 2, 1985

[51] Int. Cl.⁴ ............................................. H04M 19/06
[52] U.S. Cl. ...................................... 379/324; 379/413
[58] Field of Search .................. 379/93, 165, 156, 236, 379/237, 238, 338, 348, 399, 413, 176, 166, 324, 322, 323, 186; 363/65

[56] References Cited

U.S. PATENT DOCUMENTS

| | | | |
|---|---|---|---|
| 4,203,011 | 5/1980 | Coviello | 379/165 X |
| 4,425,512 | 1/1984 | Tomooka et al. | 379/324 |
| 4,564,726 | 1/1986 | Ibata | 379/165 |

FOREIGN PATENT DOCUMENTS 0160411  11/1985  European Pat. Off. ............ 379/412

OTHER PUBLICATIONS

"Electronic Contacts in Telephone Exchanges: Contact Opening and Closing Phenomena and Quenching Techniques", W. L. Scott, Post Office *Electrical Engineering Journal,* vol. 63, Pr. 3, Oct. 1970, pp. 179-188.
"Transmission Codes" *Digital Transmission Systems,* 1979, pp. 239-245.
*Telecommunications Transmission Engineering,* vol. 1—Principles, Second edition, 1977, p. 342.

*Primary Examiner*—Gene Z. Rubinson
*Assistant Examiner*—R. Vaas
*Attorney, Agent, or Firm*—Peter Visserman

[57] ABSTRACT

An arrangement for supplying electrical power from a telecommunication central office to a remote network termination employs the wires of a two-wire digital subscriber loop in parallel using earth ground as a return path. At the central office, two power supplies separately provide power to the two wires of the loop in parallel and the current supplied by the two power supplies is added at the remote interface by means of a center-tapped transformer coil which is part of the transformer used for the transmission of digitally encoded voice and data signals. A DC-to-DC converter connected to the center tap provides the required power to the interface circuitry. The DC-to-DC converter is grounded to earth ground through a low-pass filter which is designed to block higher frequency noise signals.

8 Claims, 3 Drawing Figures

POWER TRANSMISSION ARRANGEMENT FOR TELECOMMUNICATIONS SYSTEMS

TECHNICAL FIELD

The invention relates to power transmission arrangements, more particularly, to such an arrangement for supplying electrical power from a telecommunications switching system to remotely located equipment.

BACKGROUND OF THE INVENTION

In conventional telephone systems, the central office is connected to each subscriber station by a loop consisting of a pair of wires over which analog voice signals, dial pulsing and switch-hook signaling are transmitted. A power source such as the standard central office battery is connected to the loop of a conventional system and provides electrical power to the subscriber set for both voice and signal transmission. The lifting of a handset or the operation of a standard dial causes switches to be operated in the telephone set, and the resulting changes in current flow in the loop are detected at the central office which reacts in the appropriate manner.

In modern digital systems such as the Integrated Services Digital Network (ISDN), both voice and signaling are transmitted in digital form between the subscriber set and the central office over a digital subscriber line. For example, instead of relying on the detection of changes in the loop current at the central office when a station set goes to the off-hook stage, the station sends a digitally encoded protocol message to the central office indicating the off-hook state. A number of other messages, which may include information about the subscriber set and the type of call being placed are also exchanged between the central office and the customer equipment. These interface protocol messages as well as the electrical interface between the central office and customer equipment are specified in general terms by an international organization known as the International Telegraph and Telephone Consultative Committee (CCITT). To meet the standardized interface requirements, an interface unit, usually located on or near the customer premises, interconnects the transmission lines from the central office with customer sets. This interface unit includes such devices as echo cancelers and other transmission interface circuits. The CCITT specifications require that the circuitry in the interface unit be powered from the central office, in order to be independent from commercial power and to provide emergency power to at least some of the customer sets. Substantial power is required to drive the remote circuitry and the power loss in two-wire loop used in a conventional manner is such that the distance over which power can be transmitted from the central office to the interface circuit is severely limited.

It is an object of this invention to provide a power transmission arrangement from the central office to remote circuitry with a reduced power loss in order to allow the circuit to be placed a greater distance from the central office without the need of repeaters or other power boosting circuitry.

SUMMARY OF THE INVENTION

In accordance with this invention, electric power is transmitted from the central office to the remote circuitry in parallel over the two wires of the digital subscriber loop with earth ground providing the return path, while digital voice/data is transmitted in the loop in the usual fashion with current flowing in opposite directions in the two wires of the loop. Advantageously, this arrangement reduces the power loss in the loop approximately by a factor of four over the conventional arrangement whereby power is transmitted from the central office to the customer set on one wire of the loop and the other wire is used as the return path.

A filter circuit is used to eliminate low frequency noise signals, which may emanate from the earth ground plane, from interfering with digital voice and data signals transmitted on the loop. In one specific embodiment, the two-wire transmission line has a transformer at each end for the transmission of digitally encoded voice and data. A DC power source, grounded to earth ground, is connected to each line at the central office to provide power to both wires of the line separately. At the remote interface unit a DC-to-DC converter which is grounded to earth ground receives power from both wires simultaneously. Thus the direct current path is from the central office power supply in parallel through the two wires of the loop, through the DC-to-DC converter, and back to the central office via earth ground.

Advantageously, this invention allows a remote network termination interface unit in a digital subscriber loop to be placed a much greater distance from the central office than any prior art arrangement, while supplying the required power to the interface unit and meeting the requirements of CCITT.

BRIEF DESCRIPTION OF THE DRAWING

The invention may be better understood from the following detailed description when read with reference to the drawing in which.

DETAILED DESCRIPTION

Figure 1:
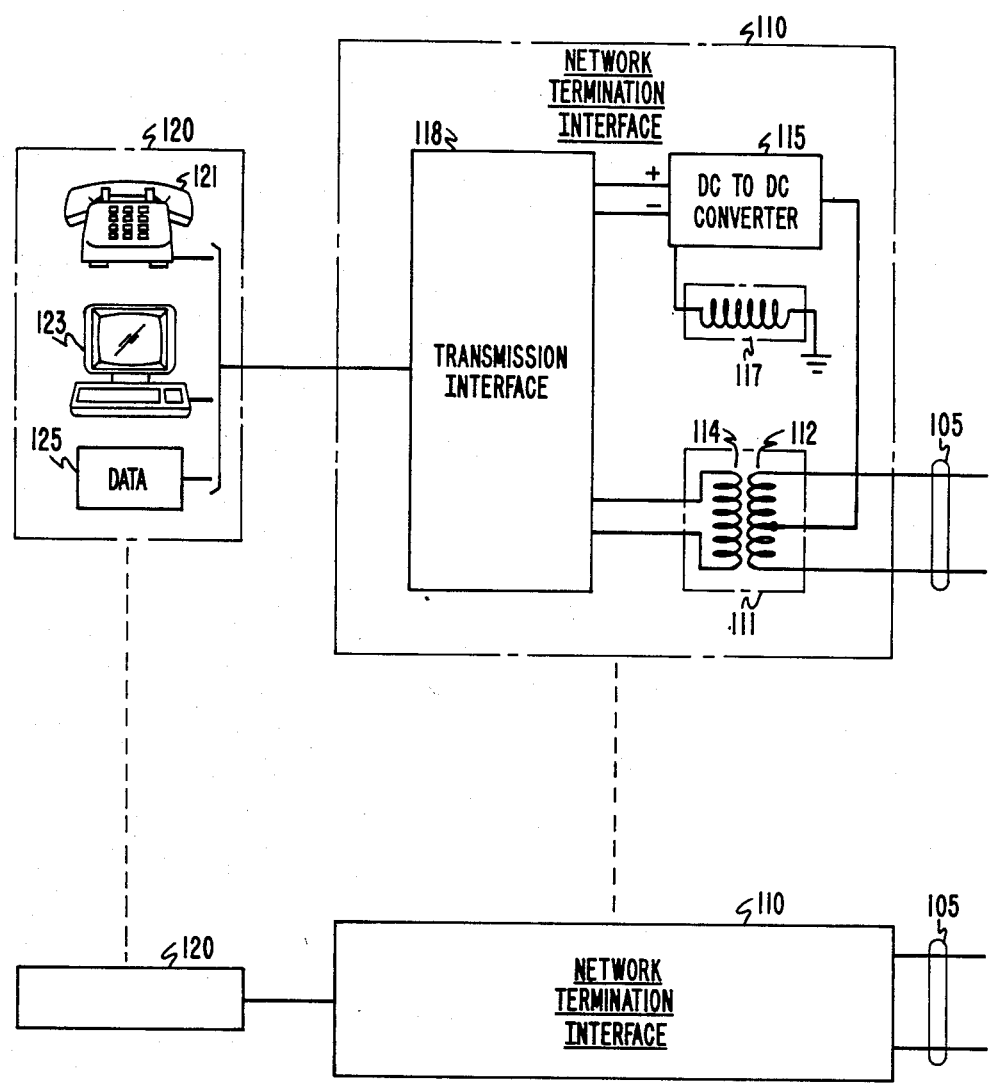
FIG. 1 and FIG. 2 together show a communication system interconnection incorporating a power transmission arrangement in accordance with the principles of this invention.
Figure 2:
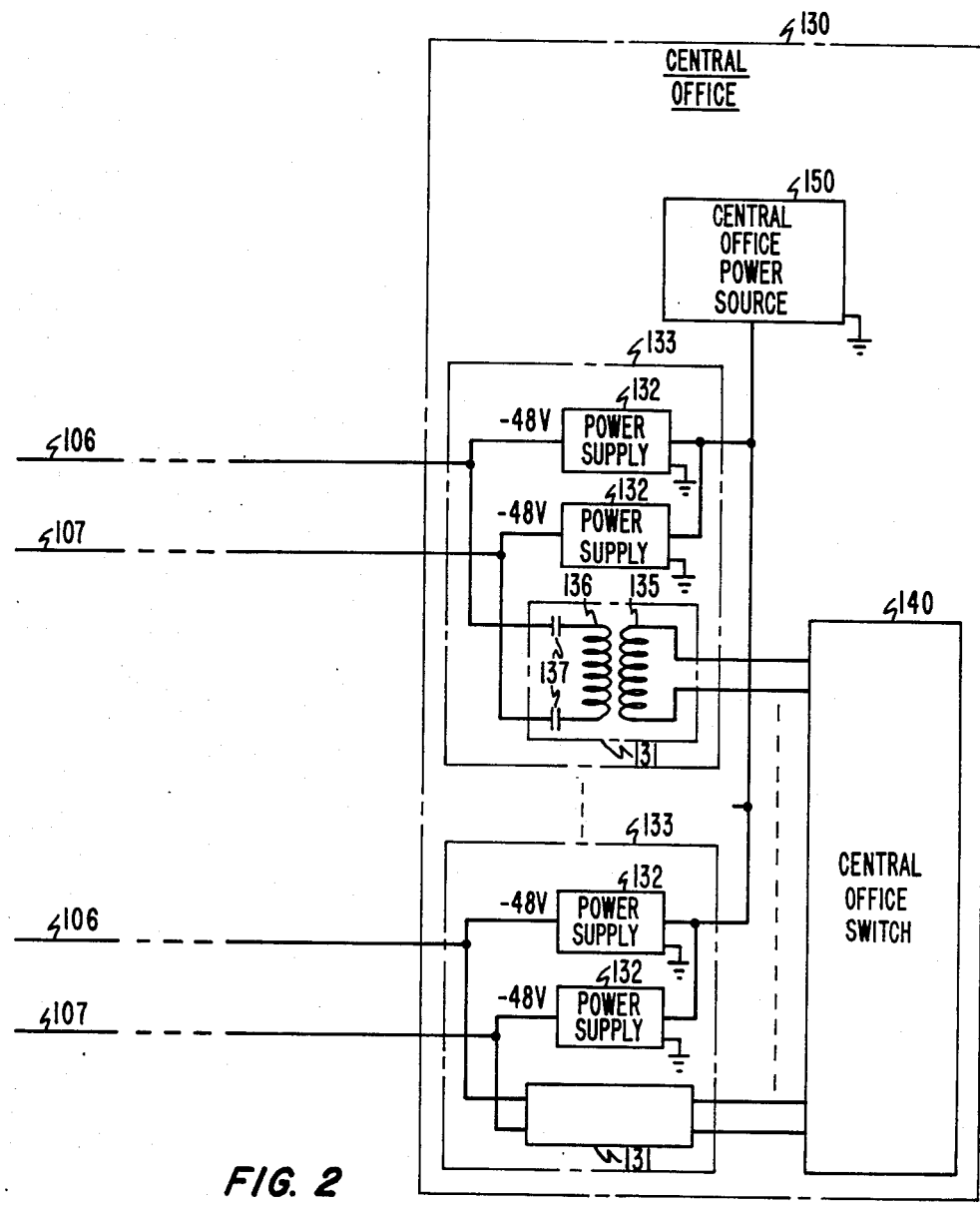
Figure 3:
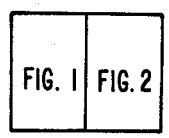
FIG. 3 is a composite showing the relationship of FIG. 1 and FIG. 2.

In the illustrative embodiment of this invention as depicted in the drawing and described herein, a two-wire digital subscriber line 105 interconnects a network termination interface unit 110 and a telephone central office 130. The telephone central office 130 will normally contain a number of line interface circuits such as circuit 133 each connected to a network termination interface unit 110, which in turn may be connected to the subscriber premises equipment of a single subscriber such as the subscriber equipment 120. The central office comprises a switch 140 which will include a switching network and other equipment (not shown in the drawing) required to selectively interconnect different subscribers via the line interface circuits. Such a central office structure is well known in the art and may, for example, be the 5ESS TM switch described in the *AT&T Technical Journal*, Vol. 64, No. 6, Part 2, July–Aug. 1985. The central office customarily comprises a DC power source 150, commonly referred to as central office battery, providing a standard −48 volts DC to the circuitry of the central office.

The subscriber loop 105 is terminated at the central office in a line unit 133 which includes a separate power supply unit 132 for each wire of the loop and a pulse transformer 131 for the transmission of digitally encoded voice and data. The central office comprises one such line termination unit for each digital subscriber loop 105 connected to the central office. The power supply units 132 are driven from the central office power source 150 and each of the units is grounded to earth ground. The transformers 131 are standard pulse transformers having one transformer coil 136 connected to the two wires of the subscriber line 105 and a coil 135 connected to the central office switch for interconnection in the switch in the customary fashion. A pair of blocking capacitors 137 are inserted between the terminals of coil 136 and the wires of the subscriber line 105 to block the DC current produced by the power supply units 132. Each of the power supply units 132 may be a commercially available electronic device known as a constant current source which supplies a constant current to the connected line at −48 volts.

The network termination interface unit 110 includes a transmission interface 118, a DC-to-DC converter 115 which provides power to the transmission interface 118, and a pulse transformer 111. The transmission interface 118 is an interconnection unit between the pulse transformer 111 and the equipment on the customer premises 120. The customer premise equipment may include a digital telephone set for the receipt and transmission of digitally encoded voice such as set 121, as well as a video display terminal 123 and other data terminals such as data terminal 124. All of these will normally be connected to the transmission interface 118 by means of a four-wire bus. The transmission interface then includes circuitry such as a hybrid circuit to convert from two-wire transmission from transformer coil 114 to four-wire transmission from the customer premises. Furthermore, this unit will typically include echo canceling circuitry and transmit and receive circuitry all of which may require a substantial amount of electrical power.

The transmission interface 118 receives its power from the DC-to-DC converter 115. This may be a standard commercially available circuit which provides output voltage at a desired level. The DC-to-DC converter receives its power from the center tap of transformer coil 112 and is grounded to earth ground through a lowpass filter 117. Power is delivered to the DC-to-DC converter over wires 106 and 107 in parallel. Current from line 106 flows through the upper part of transformer coil 112 to the center tap and current in line 107 flows through the lower part of transformer coil 112 to the center tap where the current is added. It is assumed that the current from the two constant current power supplies 132 which supply lines 106 and 107 is very nearly equal. The center tapped transformer coil 112 should be balanced as well. In such a balanced arrangement, any flux that may be generated by the DC current in the two parts of the transformer coil should cancel with little or no noticeable effect from the DC current on digital pulses transmitted through the transformer. An alternate arrangement for providing current to wires 106 and 107 is by means of a center tapped transformer at the central office. For example, in that arrangement the coil 136 would have a center-tapped terminal and current would split in a balanced coil approximately equally between the two wires 106 and 107. In that arrangement, no blocking capacitors such as capacitors 137 would be installed.

The drawing shows a digital signal transmission path from equipment on the customer premises 120 to the central office 130. Digitally encoded voice and data, including protocol messages, are transmitted via the network termination interface transformer consisting of the coils 114 and 112 and via the two-wire digital subscriber line 105 which terminates in the central office transformer 131. The digital signals are passed through the transformer coils 136 and 135 to a switching network. As a digital signal is generated in the transformer coil 114 at network interface, a corresponding pulse is induced in transformer coil 112 causing current to flow serially in the lines 106 and 107 of the digital loop 105 and in the transformer coil 136 at the central office. Thus, the current path in the digital loop 105 for digitally encoded voice and data is analogous to that for analog voice in conventional telephone systems.

In addition, the two-wire loop 105 provides a portion of the power transmission circuit. This circuit extends from the two power supplies 132 to the DC-to-DC converter 115, via the parallel path provided by loop wires 106 and 107, and from converter 115 via the filter 117 and an earth ground return path back to the power supply 132. The limiting factor in power transmission from the central office to the remote network termination circuit 110 is the resistance of the wires 106 and 107. A substantial amount of power is required to drive various electronic circuits of the transmission interface 118 and with an increase in distance from the central office, the voltage drop due to the resistance of the transmission line becomes such that insufficient power reaches the network termination interface 110. Use of the transmission lines 106 and 107 in parallel and the use of earth ground for a return path reduces the resistance introduced by the transmission line by a factor of four over the conventional arrangement using one wire of the two-wire loop as a path in one direction and using the other wire as a return path. For example, if the resistance of one wire is equal to R, then in accordance with the conventional arrangement, the total path resistance which determines the voltage drop in the line is 2R. When lines 106 and 107 are used in parallel to provide one path, the resistance in that path is equal to R/2, thus, theoretically reducing the power loss in the transmission line by a factor of four. As a practical matter, depending on local soil conditions, the voltage drop resulting from the earth ground is usually assumed to be on the order of 3–5 volts.

The low-pass filter 117 is connected between the DC-to-DC converter 115 and earth ground to allow passage of direct current and to prevent noise signals such as harmonics of 60 Hz emanating from commercial power transmission and other sources from interfering with the pulses representing digitally encoded voice and data transmitted over the wires 106 and 107.

The arrangement described herein is particularly suitable in digital transmission systems employing bipolar coding. The bipolar coding scheme is a well-known scheme which does not apply a DC bias and in which low frequency energy is deemphasized. Accordingly, the DC power transmitted over wires 106 and 107, even with normal fluctuations, should not interfere with the transmission of binary digits in the bipolar format or in other formats which deemphasize low frequency energy. Even with transmission schemes which rely more heavily on the low frequency energy, the principles of the this invention apply, but a closer control of the power source 132 and tighter restrictions on the low-pass filter 117 may be required. It is to be understood that the above-described arrangement is merely an illustrative application of the principles of the invention and that numerous other arrangements may be devised by those skilled in the art without departing from the spirit and scope of the invention.

What is claimed is:

1. A power transmission arrangement for use in communications systems for the simultaneous transmission of digital pulses and electrical power from a central office to a remote customer interface unit comprising:

a pair of transmission wires extending between said central office and said interface unit and terminating in a transformer at said central office and in a transformer at said interface unit, for the transmission of digital pulses between the central office and the interface unit, said transformer in said interface unit comprising a center tapped coil having a pair of end terminals connected to said pair of wires and a center tap terminal;

a power source connected to said pair of wires at said central office for supplying electrical power separately to each wire, said power source being grounded to earth ground; and a power conversion circuit at said interface unit having an input terminal connected to said center tap terminal and a ground terminal connected to earth ground.

2. The arrangement in accordance with claim 1 wherein said power source comprises a first power supply unit connected between one of the transmission wires and earth ground and a second unit connected between the other transmission wire of the pair and earth ground.

3. The arrangement in accordance with claim 2 wherein said transformer at the central office comprises a pair of end terminals and said arrangement further comprises a pair of capacitors, one of said capacitors being connected between one of the pair of wires and one of the end terminals of the transformer at the central office and another capacitor connected between the other wire of the pair of wires and another of the end terminals of the transformer at the central office.

4. The arrangement in accordance with claim 1 wherein said center tapped coil comprises two balanced portions designed to create equal but opposite flux in the presence of equal currents.

5. The arrangement in accordance with claim 4 further comprising a low-pass filter connected between earth ground and said ground terminal of said power conversion circuit.

6. A power supply arrangement for supplying electrical power from a central office to a remote customer interface comprising electronic circuits and connected to the central office by means of a two wire transmission line for the transmission of digital pulses between the central office and the customer interface unit, said transmission line terminating in one transformer at the customer interface unit and in another transformer at the central office;

the arrangement comprising two power sources in the central office each having a ground terminal connected to earth ground, one power source being connected to each wire of the two wire transmission line, and a pair of capacitors connected in series between the two wires of the transmission line and the transformer at the central office;

the transformer at the interface unit comprising a center tapped coil having end points connected to the wires of the transmission line;

the interface unit comprising a power converter circuit having a ground terminal connected to earth ground and an input terminal connected to the center tap, for providing power to the interface circuits.

7. An arrangement for supplying electrical power from a central office to a remote customer interface unit connected to the central office by a pair of transmission wires terminating in a transformer at the central office and at the interface unit for the transmission of digital pulses between the central office and the remote interface unit, the power supplying arrangement comprising a pair of power sources at the central office, each power source having an output terminal connected to one of said transmission wires and a ground terminal connected to earth ground for separately supplying power to each wire of said pair of wires, the interface unit having at least one electrical circuit having an input terminal and having a ground terminal connected to earth ground, said transformer terminating said transmission wires at the interface unit comprising a center tapped coil having end terminals connected to said pair of wires and a center terminal connected to said input terminal of said at least one electrical circuit, whereby electrical power is transmitted from said central office to said interface unit in parallel over said pair of transmission wires and a return path between said power sources and said electrical circuit is provided by earth ground.

8. An arrangement for transmitting of electrical power from a telecommunication switching office to a remote customer interface unit interconnected by a communication circuit comprising a pair of wires extending between said switching office and said remote customer interface unit and terminating at said interface unit in a transformer coil having a center tap; the power transmission arrangement comprising a power source having output terminals connected to said wires at said switching office for supplying power to each of said wires separately and a ground terminal connected to earth ground, power converter means having an input terminal connected to the center tap of said transformer coil at said interface unit and having a ground terminal, and filter means connected between said ground terminal of said power converter and earth ground for preventing the passage of signals of predetermined frequencies.

* * * * *